(12) United States Patent
Kitchloo et al.

(10) Patent No.: US 11,110,630 B2
(45) Date of Patent: Sep. 7, 2021

(54) SYSTEM AND METHOD FOR CONFORMAL COOLING DURING A LENS MANUFACTURING PROCESS

(71) Applicant: ESSILOR INTERNATIONAL, Charenton le Pont (FR)

(72) Inventors: Paresh Kitchloo, Dudley, MA (US); Nathan Payne, Dudley (MA); Severine Tisne, Dudley, MA (US)

(73) Assignee: Essilor International, Charenton-le-Pont (FR)

( * ) Notice: Subject to any disclaimer, the term of this patent is extended or adjusted under 35 U.S.C. 154(b) by 255 days.

(21) Appl. No.: 16/087,973

(22) PCT Filed: Mar. 25, 2016

(86) PCT No.: PCT/US2016/024285
§ 371 (c)(1),
(2) Date: Sep. 24, 2018

(87) PCT Pub. No.: WO2017/164892
PCT Pub. Date: Sep. 28, 2017

(65) Prior Publication Data
US 2019/0111588 A1   Apr. 18, 2019

(51) Int. Cl.
*B29D 11/00* (2006.01)
*B29C 33/04* (2006.01)
*B29C 33/38* (2006.01)
*B29C 45/73* (2006.01)
*G02B 1/04* (2006.01)
(Continued)

(52) U.S. Cl.
CPC .......... *B29C 33/04* (2013.01); *B29C 33/3828* (2013.01); *B29C 45/7331* (2013.01); *B29D 11/00* (2013.01); *B29D 11/00442* (2013.01); *G02B 1/043* (2013.01); *B33Y 70/00* (2014.12); *B33Y 80/00* (2014.12)

(58) Field of Classification Search
CPC ... B29D 11/00; B29D 11/00442; B29C 33/04; B29C 33/3828; B29C 45/7331
See application file for complete search history.

(56) References Cited

U.S. PATENT DOCUMENTS

| 6,290,882 B1 * | 9/2001 | Maus .................... B29C 45/561 264/2.2 |
| 2013/0235581 A1 | 9/2013 | Iatan |
| 2016/0082629 A1 * | 3/2016 | Modi .................. B29C 45/1618 264/28 |

FOREIGN PATENT DOCUMENTS

| CN | 202 114 867 U | 1/2012 |
| WO | 2012/055046 A1 | 5/2012 |

OTHER PUBLICATIONS

International Search Report and Written Opinion, dated Dec. 14, 2016, from corresponding PCT application No. PCT/US2016/024285.

* cited by examiner

*Primary Examiner* — Mathieu D Vargot
(74) *Attorney, Agent, or Firm* — Nixon & Vanderhye (57) ABSTRACT

The disclosed embodiments include a system and method for manufacturing a lens. In one embodiment, the system includes a lens mold. According to the embodiment, the lens mold contains a part cavity and a material flow path fluidly coupled to the part cavity and a lens material inlet. The system also includes a heat transfer insert. According to the embodiment, the heat transfer insert includes an insert
(Continued)

surface positioned adjacent to a part surface of the cavity, a sealed fluid inlet, a sealed fluid outlet, and a conformal fluid conduit that extends from the sealed fluid inlet to the sealed fluid outlet.

18 Claims, 8 Drawing Sheets

(51) Int. Cl.
*B33Y 70/00* (2020.01)
*B33Y 80/00* (2015.01)

SYSTEM AND METHOD FOR CONFORMAL COOLING DURING A LENS MANUFACTURING PROCESS

FIELD

The present disclosure relates generally to lens manufacturing systems and methods for manufacturing lenses in an injection molding process.

BACKGROUND

Ophthalmic lenses for use in, for example, eye glasses, may be formed using an injection molding manufacturing process. The process includes injecting material into a mold, and can be performed with a host of materials, including elastomers, thermoplastic and thermosetting polymers, and mixtures thereof.

The process typically involves using a ram or screw-type plunger to force molten polymer material into a mold or part cavity where the material solidifies into the shape of the mold to form a molded part. The material may be injected at a high pressure and high temperature to ensure the polymer takes the shape of the desired part, which may be, for example, an ophthalmic lens.

Molds can include a single part cavity or multiple part cavities. In multiple cavity molds, each cavity can be identical and form the same parts or can be unique and form multiple parts having different geometries during a single cycle. Molds are generally made from tool steels, but stainless steel and aluminum molds are suitable for certain applications.

When thermoplastics are molded in an injection molding process, pelletized raw material is typically fed through a hopper into a heated barrel with a reciprocating screw. Upon entrance to the barrel, the material is heated, causing the Van de Waals forces that resist relative flow of individual polymer chains to weaken as a result of increased space between molecules at higher thermal energy states. This reduces the polymer's viscosity, facilitating flow of the polymer material into the mold.

When enough material has gathered at the front of the reciprocating screw, the material is forced at high pressure and a desired velocity into the part forming cavity. To prevent spikes in pressure, the process is generally a two-phase process wherein the screw controls material flow rate, or velocity, during the first phase until the cavity is 95-98% full (the transfer position). Injection times often range from twenty-five to fifty seconds, or less.

During the second phase, which starts when the screw reaches the transfer position, the screw operation shifts to regulating pressure in the mold. During this phase, a packing pressure is applied to force material into the mold, and the mold completes filling and compensates for any thermal shrinkage of material in the cavity. Shrinkage may be relatively high for thermoplastics as compared to other materials. To offset the packing pressure, the mold may also include a press that keeps the mold closed during the injection process.

The packing pressure is applied until material at the entrance to the cavity, which may be referred to as a gate, solidifies. The gate volume is typically small relative to the cavity volume.

Once the gate volume solidifies, no more material can enter the cavity, and the screw reciprocates and acquires material for the next cycle. Contemporaneously, material within the mold cools so that it can be dimensionally stable when ejected from the cavity. Once the desired temperature has been achieved after cooling, the mold opens and an array of pins, sleeves, strippers, or similar mechanisms are driven forward to eject the article. Then, the mold closes and the process is repeated.

SUMMARY

In accordance with an illustrative embodiment, a lens manufacturing system includes a mold having a part cavity and a material flow path fluidly coupled to the part cavity and a lens material inlet. The system also includes a heat transfer insert having an insert surface that is positioned adjacent to a part surface of the cavity. The heat transfer insert includes an insert surface positioned adjacent to a part surface of the cavity, a sealed fluid inlet, a sealed fluid outlet, and a conformal fluid conduit that extends from the sealed fluid inlet to the sealed fluid outlet.

In accordance with another illustrative embodiment, a method for manufacturing a lens includes delivering a molten lens material to a material flow path having a lens material inlet and a lens material outlet that is fluidly coupled to a cavity of a mold that defines a structure of a lens. The method also includes flowing the molten lens material through the material flow path into the cavity and dissipating heat from the molten lens material through a heat transfer insert having an insert surface that may form a part surface of the cavity, where the heat transfer insert includes a conformal fluid conduit. The method also includes retrieving a solidified lens from the cavity after solidification of the molten lens material.

In accordance with another illustrative embodiment, a heat transfer insert includes an insert surface that forms a part surface of a part cavity. The heat transfer insert includes a sealed fluid inlet, a sealed fluid outlet, and a conformal fluid conduit extending from the sealed fluid inlet to the sealed fluid outlet.

Additional details of the disclosed embodiments are provided in the description below and in the corresponding drawings.

BRIEF DESCRIPTION OF THE DRAWINGS

Illustrative embodiments of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different embodiments may be implemented.

DETAILED DESCRIPTION

The present disclosure relates to an injection molding system having conformal heat transfer inserts that enhance and accelerate the molding process by improving the heat transfer capabilities of the mold.

Lens manufacturing systems may use a variety of cooling methods to facilitate cooling of molten lens material in a molding process. In the case of an ophthalmic lens, the material may be a polycarbonate, poly-methyl methacrolate, polystyrene, polyurethane, a copolymer or blend of any of the foregoing, or any other suitable material. These cooling methods may include placing fluid conduits around part cavities of a mold. The fluid conduits may be used to facilitate the circulation of water or oil from, for example, a thermolator, throughout the mold system.

The fluid conduits provide a fluid flow path to circulate cooling fluids to facilitate cooling during a lens production cycle. The conduits may also be used to circulate heated fluid through the mold to maintain the mold at a selected temperature. For illustrative purposes however, the conduits are generally described as fluid conduits that circulate cooling fluid.

Certain cooling methods, including the aforementioned use of fluid conduits may provide uneven cooling across a cavity of a mold, resulting in lens defects. Examples of lens defects include, but are not limited to, the presence of weld-lines, warping of the lens, power variance of a lens within a cavity and between different lenses within different cavities of the mold, and birefringence of lenses. These defects may result in unusable molded parts, significantly increasing lens production costs and decreasing the lens production quality and quantity.

Lens manufacturing systems typically include a lens mold that contains a plurality of lens cavities to mass produce lenses during each manufacturing cycle. However, some mold configurations may not provide uniform cooling throughout the lens mold. For example, molten lens material in lens cavities disposed close to a fluid conduit may cool at a faster rate than molten lens material in cavities disposed further away from the fluid conduit. Generally, a new manufacturing cycle will not commence until lens materials in each cavity of the mold have solidified. Thus, mold configurations that demonstrate uneven cooling may contribute to increased manufacturing cycle times.

Systems, molds, and methods described herein provide for enhanced heat transfer to and from mold cavities, and more particularly, to cooling mechanisms that provide uniform cooling of molten lens materials in a cavity of a lens manufacturing system and uniform cooling across multiple cavities of the lens manufacturing system.

The heat transfer inserts may include multiple conformal fluid conduits that are positioned across the cavity. As referenced herein, a conformal fluid conduit is a conduit for transporting fluid across a part cavity that is shaped in consideration of the geometry of the part. In some embodiments, one or more conformal fluid conduits may vary in density and cross-sectional area to account for changes in the thickness of the part. In addition, the conformal fluid conduits may be offset from the part surface by a predetermined distance.

In some embodiments, cooling fluids flow through the conformal fluid conduits to facilitate dissipation of heat from the molten lens materials. The conformal fluid conduits may have varying dimensions proportional to the thickness of the cavity at the portion of the cavity surface where the conformal fluid conduits are positioned. The openings of the conformal fluid conduits may also be positioned at various locations across the surface of the cavity. The proximity of the heat transfer inserts to the cavity may also be varied to facilitate uniform cooling across the cavities. For example, conduits may be closer to thicker portions of the cavity and further away from thinner portions.

In an embodiment, an additive manufacturing technology, such as three-dimensional printing, is utilized to manufacture components of the lens manufacturing system. In some embodiments, a hybridized manufacturing technology may be used that includes elements of traditional processes (e.g., molding and milling), in conjunction with additive manufacturing. Generally, additive manufacturing technology enables heat transfer inserts to be formed in a variety of dimensions based on the dimensions of the cavity to ensure uniform cooling of the cavity. Additive manufacturing technology also allows for the formation of heat transfer inserts having conformal fluid conduits with geometries that may be difficult to form using conventional manufacturing techniques such as milling. For example, the conformal fluid conduits may form a circuitous flow path about the part cavity, such as a spiral flow path, or may have a flow path that varies in length, diameter or cross-sectional profile. In addition, the heat transfer inserts may be manufactured to include more complicated geometric features to enhance the rate of heat transfer facilitated by each conduit. For example, internal heat transfer fins, vortex-inducing flow directors, and other similar features may be included within the conformal fluid conduits to enhance heat transfer between the lens cavity and the heat transfer inserts. The use of heat transfer inserts having conformal fluid conduits may provide for more uniform cooling of molded parts, helping to reduce the risk of lens defects, such as, but not limited to the presence of weld-lines, warping of the lens, power variance, and birefringence. Uniform cooling across the lens cavity of the lens manufacturing system may also decrease lens manufacturing cycle time, thereby providing for improved lens manufacturing efficiency and quality.

Figure 1:
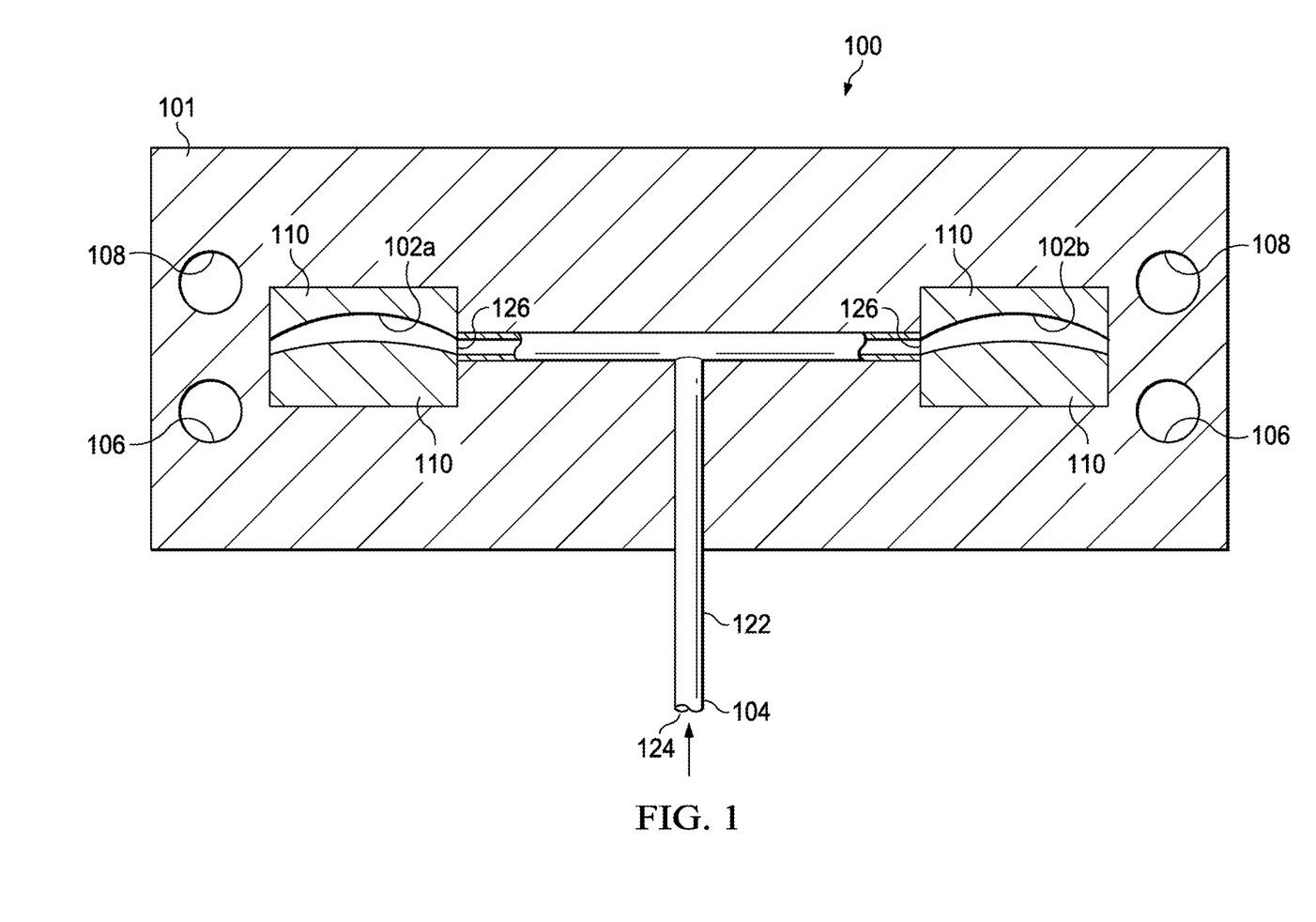
FIG. 1 is a side, section view of a portion of a lens manufacturing system that utilizes conventional cooling, including lens cavities, an inlet tube, and fluid conduits.

Turning now to the figures, an illustrative lens manufacturing system 100 that utilizes conventional cooling is shown in FIG. 1. The lens manufacturing system 100 includes a mold 101 having several lens cavities 102*a* and 102*b*, with each lens cavity 102*a* or 102*b* having a shape that is substantially similar to that of a lens, such as an ophthalmic a lens. The lens cavities 102*a* and 102*b* are partially formed by opposed, spaced apart optical inserts 110, which may be glass or metal. More particularly, each of the optical inserts 110 is configured to define a surface of an optical lens by forming an optical surface at the interface between lens material that is disposed in one of the lens cavities 102*a* or 102*b* and a surface of the optical insert 110.

The lens manufacturing system 100 also includes an inlet tube 104 that forms a material flow path 122. The inlet tube 104 has an inlet opening 124 that is fluidly coupled to a lens material source (not shown). In some embodiments, the inlet tube 104 is a single piece tube that further bifurcates into two sections, each of the two sections terminating at a respective bifurcated end and outlet openings 126, which are fluidly coupled to lens cavities 102a and 102b, respectively. In other embodiments, the inlet tube 104 is constructed from several sections, where each section of the inlet tube 104 that terminates at one of the outlet openings 126 is separately joined or welded at a junction to connect the respective section to the section of the inlet tube 104 that terminates at the inlet opening 124. During operation of the lens manufacturing system 100, a molten lens material is injected from the lens material source, into the inlet tube 104, and flows along a fluid flow path defined by the inlet tube, into each of the cavities 102a and 102b. The molten lens material then solidifies into a desired shape as defined by the cavities 102a and 102b.

Fluid conduits 106 and 108 are routed about the perimeter of the mold proximate to an edge of each of the cavities 102a and 102b to facilitate circulating cooling fluid about the perimeter of the mold cavities 102a and 102b, thereby allowing dissipation of heat from the mold 101. However, this orientation may provide uneven cooling because the portion of each lens that is closest to the fluid conduits 106 and 108 will cool faster than the portion of each lens that is positioned furthest away from the fluid conduits 106 and 108. The cooling characteristics of the system of FIG. 1 may therefore be relatively uneven.

Figure 2:
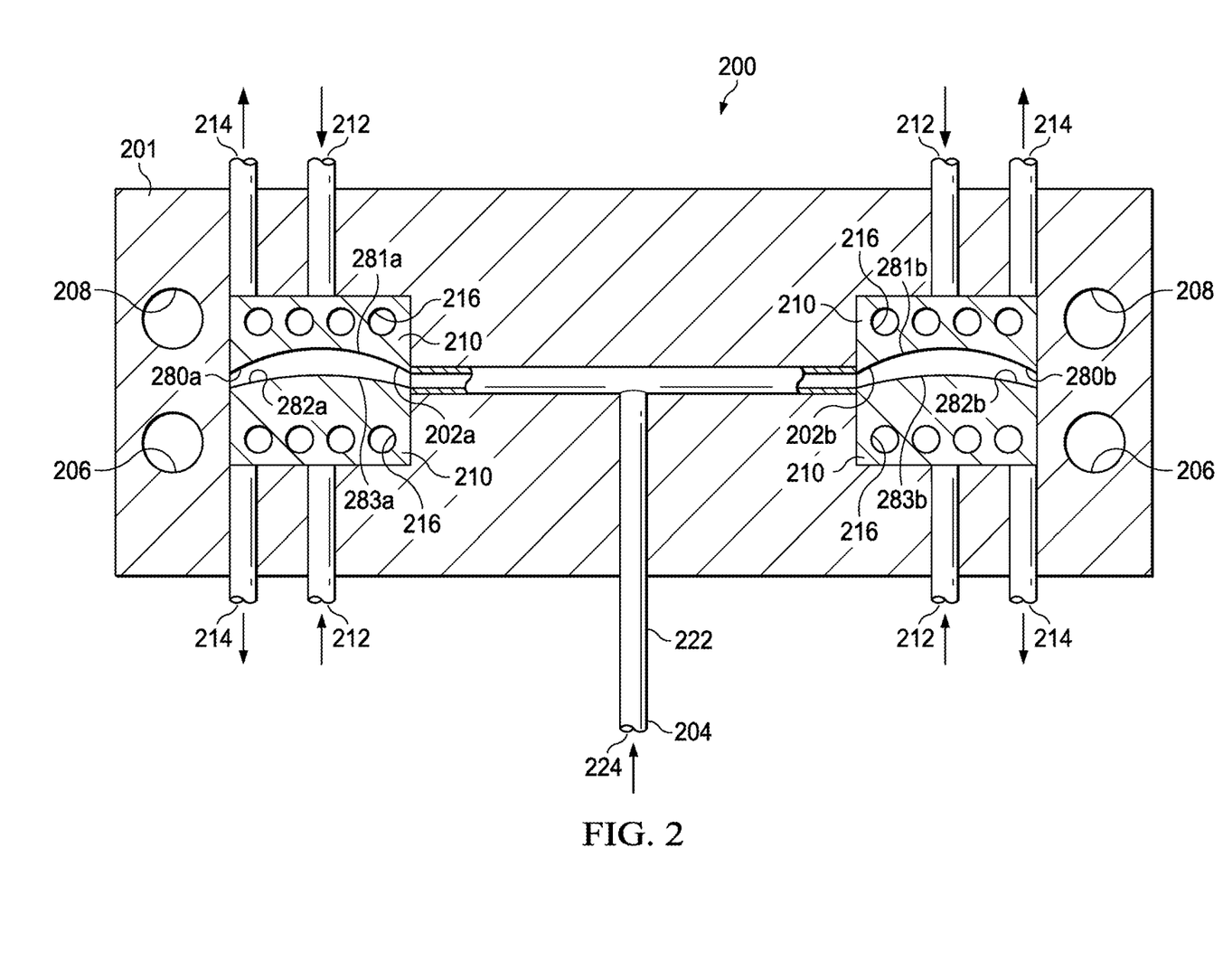
FIG. 2 is a side, section view of a portion of a lens manufacturing system that utilizes conformal cooling in accordance with an illustrative embodiment, including lens cavities, a runner, fluid conduits, and heat transfer inserts.

FIG. 2 illustrates an exemplary embodiment of a lens manufacturing system 200 that utilizes conformal cooling in accordance with the present disclosure. The system 200 includes lens cavities 202a and 202b and an inlet tube 204 that forms a material flow path 222. The inlet tube 204 has an inlet opening 224 that is fluidly coupled to a lens material source (not shown) and outlet openings 226 that are fluidly coupled to the coupled to the lens cavities 202a and 202b for providing molten material to the lens cavities 202a and 202b. The system 200 also includes perimeter fluid conduits 206 and 208. In some embodiments, the fluid conduits 206 and 208 are cooling fluid conduits to provide cooling to the cavities 202a and 202b. In other embodiments, the fluid conduits 206 and 208 are heating fluid conduits to provide heat to the cavities 202a and 202b.

The system 200 also includes opposing heat transfer inserts 210. In some embodiments, the heat transfer inserts 210 are positioned adjacent to opposite surfaces of cavities 202a and 202b throughout the lens manufacturing system 200. More particularly each heat transfer insert 210 defines a portion of a surface of the cavity 202a or 202b that is adjacent to the respective heat transfer insert 210. The heat transfer inserts 210 facilitate substantially uniform and expedient heating and cooling of the cavities 202a and 202b of the lens manufacturing system 200. The heat transfer inserts 210 may include an optical processing material positioned on at least a portion of the inner surface of the heat transfer inserts that is exposed to the lens cavities. To that end, each heat transfer insert 210 may include a glass or metallic surface that is suitable for contacting the optical lens part during molding. The glass or metallic surface may be welded or otherwise bonded to the inner surface 280a, 280b, 282a, or 282b of the heat transfer inserts 210 or integrally manufactured with the heat transfer inserts 210 using, for example, an additive manufacturing process. In another embodiment, the heat transfer inserts 210 may be integrally formed with the body of the lens mold 201 using a similar manufacturing technique.

As shown more particularly in FIG. 2, a first lens cavity 202a and a second lens cavity 202b are formed within a lens mold 201. The first and second lens cavities 202a and 202b are defined by opposing inner surfaces 280a, 280b, 282a, and 282b of inserts 210 that contact lens materials during lens production to form optical lens surfaces on the molded lenses created using the mold 201. The inlet tube 204 has an inlet opening 224 coupled to a material source (not shown) and outlet openings 226 coupled to the first and second lens cavities 202a and 202b. The inlet tube 204 may also be coupled to additional lens cavities (not shown).

In the embodiment of FIG. 2, the heat transfer inserts 210 define a portion of the upper and lower surfaces 280a and 282a of the first lens cavity 202a and the upper and lower surfaces 280b and 282b of the second lens cavity 202b. Each heat transfer insert 210 has a sealed fluid inlet 212 a sealed fluid outlet 214, and at least one cooling fluid conduit 216, extending through at least a portion of the body of the heat transfer insert 210. Each of the sealed fluid inlets 212 and sealed fluid outlets 214 has a proximal end connected to an outer surface of the heat transfer insert 210 and an opposite and distal end that is sealable. In an embodiment, a temperature-controlled fluid source, such as a thermolator (not shown) is fluidly coupled to the sealed fluid inlet 212. Similarly, a fluid outlet conduit is fluidly coupled to the sealed fluid outlet 214. The conduit 216, which may be a conformal fluid conduit, provides a fluid flow path through at least a portion of the heat transfer insert 210 from the sealed fluid inlet 212 to the sealed fluid outlet 214.

The heat transfer inserts 210 may be constructed from a variety of materials and/or composite materials. For example, the heat transfer inserts 210 may be constructed from a metal or a metal alloy, including, but not limited to, steel, stainless steel, aluminum, copper, or a combination or alloy thereof, including, for example, beryllium-copper alloy a nickel-based alloy, and mineral glass. In an embodiment, heat transfer insert 210 has a heat transfer coefficient of between 15 and 250 W/(m²K).

As shown in FIG. 2, in an embodiment, external surfaces 281a 281b, 283a, and 283b of the heat transfer inserts 210 define a portion of the first cavity 202a and second cavity 202b, respectively. In such an embodiment, the heat transfer inserts 210 may be manufactured from a material that allows the external surfaces of the respective heat transfer insert 210 to be in contact with lens materials during the lens manufacturing process without causing lens defects or delaying lens manufacturing cycle time (for example, glass or a suitable metal). In such an embodiment, the conduit 216 of the heat transfer insert 210 is positioned to facilitate the transfer of heat from the lens material to the heat transfer insert 210 and any cooling fluid being circulated there through. Additional heat transfer inserts (not shown) may be positioned proximate to the first and/or second lens cavity 202a and 202b to achieve uniform cooling and to reduce lens manufacturing cycle time.

Figure 3A:
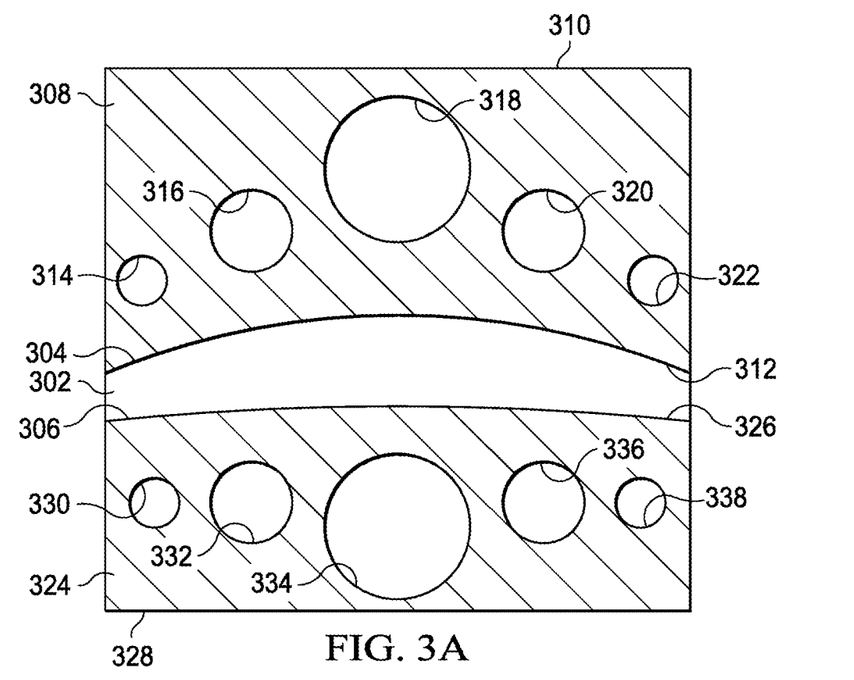
FIGS. 3A, 3B, 4A, and 4B are section views showing alternative embodiments of heat transfer inserts having conformal fluid conduits around a lens cavity having non-uniform thickness.

FIG. 3A illustrates an alternative embodiment of a first heat transfer insert 308 having a plurality of conformal fluid conduits 314, 316, 318, 320, and 322 and a second heat transfer insert 324 having conformal fluid conduits 330, 332, 334, 336, and 338, the first and second heat transfer inserts 308 and 324 being adjacent a lens cavity 302 and having non-uniform thickness. The lens cavity 302 has a convex upper surface 304 and an opposing concave lower surface 306. The lens cavity 302 has an increased thickness at the center of the cavity 302 and a decreased thickness at the edges to form a lens of similar dimensions. The first heat transfer insert 308 is disposed proximate to the upper surface 304 and the second heat transfer insert 324 is disposed proximate to lower surface 306. The first heat transfer insert 308 has a first surface 310 and a second surface 312 having a concave profile that complements a convex surface 304 of the lens cavity 302 to form an optical surface. As referenced herein, an optical surface is understood to be a surface that has desired optical properties and may be suitable for use as a lens surface. The first heat transfer insert 308 includes a plurality of conformal fluid conduits 314, 316, 318, 320, 322 that are configured to transfer heat from the lens cavity 302 and any lens material disposed therein. In the embodiment of FIG. 3A, the conformal fluid conduits are arranged to provide a higher rate of fluid circulation and associated heat transfer at the center of the lens cavity 302 relative to rate of fluid circulation and associated heat transfer around the ends of the lens cavity 302 to account for increased material thickness. In addition, the conformal fluid conduits may be arranged in a convex or concave pattern that corresponds to the contour of the upper surface 312 of the lens cavity 302.

As shown in FIG. 3A, the first heat transfer insert 308 includes first conformal fluid conduits 314 and 322, second conformal fluid conduits 316 and 320, and a third conformal fluid conduit 318. The first conformal fluid conduits 314 and 322 are the smallest in diameter and positioned near the thinner portions of the lens cavity 302; the second conformal fluid conduits 316 and 320 have a diameter that is slightly larger than the diameter of the first conformal fluid conduits 314 and 322, and are positioned adjacent a portion of the lens cavity 302 that has an intermediate thickness; the third conformal fluid conduit 318 has a relatively larger diameter and is positioned adjacent the thickest portion the lens cavity 302. The conformal fluid conduits may have any suitable diameter. For example, in a mold that would have included traditional fluid conduits having a diameter of approximately eleven (11) millimeters, the conformal fluid conduits may have a diameter of four millimeters, or more or less depending on the amount of heat transfer desired. In addition, the conformal fluid conduits are arranged along a convex arc that corresponds to the curvature of the upper surface 304 of the lens cavity 302.

With regard to the orientation of the items shown and described with regard to the figures, it is noted that the terms "upper" and "lower" are relative terms dependent on the orientation of the drawing and may alternatively be referred to as "first" and "second" or any other suitable descriptor in the event the orientations of the item changes.

Like the first heat transfer insert 308, the second heat transfer insert 324 also has a first surface 326 and a second surface 328. The second heat transfer insert 324 also includes similarly arranged first conformal fluid conduits 330 and 338, second conformal fluid conduits 332 and 336, and third conformal fluid conduit 334. The first surface 326 has a convex profile that complements the concave profile of the lens cavity 302 to form an optical surface and to allow for the conformal fluid conduits to be positioned closer to the lower surface 306 of the lens cavity 302.

Thus, the first, second, and third conformal fluid conduits of each of the heat transfer inserts 308 and 324 vary in dimension and position relative to the cavity 302 to facilitate a more uniform rate of heat transfer during the lens manufacturing process. For example, third conformal fluid conduits 318 and 334, which provide the greatest degree of heat transfer, are positioned proximate the thickest portion of the cavity 302. Similarly, first conformal fluid conduits 314, 322, 330, and 338, which provide the lowest degree of heat transfer, are positioned proximate thinnest portion of the lens cavity 302. As a result of the variance in conduit cross-sectional area, fluid flow through the third conformal fluid conduits 318 and 334 will be greater than fluid flow through the first conformal fluid conduits 314 and 330 to facilitate cooling of the thickest portion of the lens cavity 302 at or near the same rate as cooling of the thinnest portion of the lens cavity 302.

In another embodiment, flow restrictors (not shown) may be used to provide conformal fluid conduits having disparate flow rates, such that a high flow-rate conduit may be disposed proximate to thicker portions of the cavity 302 and a lower flow-rate conduit may be disposed proximate to thinner portions of the cavity 302. Further, although FIG. 3A illustrates ten conformal fluid conduits disposed across two sides of the cavity 302, the number of conformal fluid conduits positioned across the cavity 302, the proximity of a conformal fluid conduit to a surface of the cavity 302, the dimensions of the conformal fluid conduits, the flow-rate of cooling fluid that flows through the conformal fluid conduits, and the composition of the cooling fluid used in the conformal fluid conduits, may all vary. The foregoing may vary based on the thickness of the cavity proximate to the relevant conformal fluid conduit, the composition of the lens material used, and a combination thereof.

Figure 3B:
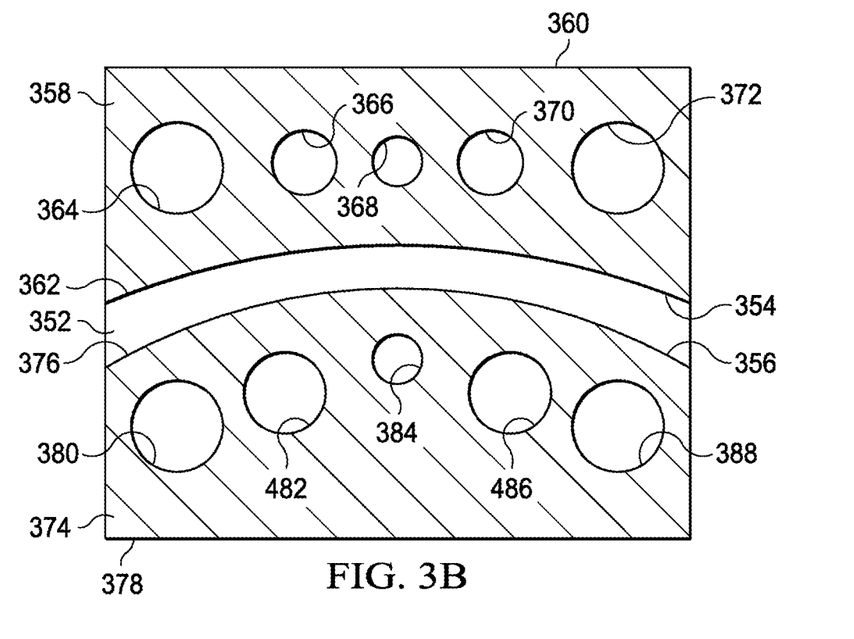

FIG. 3B illustrates placement of conformal fluid conduits around a cavity 352 having non-uniform thickness. The cavity 352 has an upper surface 354 and an opposing lower surface 356. Similar to the arrangement of FIG. 3A, a first heat transfer insert 358 is disposed proximate to the first surface 354 and a second heat transfer insert 374 is disposed proximate to second surface 356. The first heat transfer insert 358 has a first surface 360 and a concave second surface 362. The first heat transfer insert 358 includes first conformal fluid conduits 364 and 372, second conformal fluid conduits 366 and 370, and a third conformal fluid conduit 368. The second heat transfer insert 374 has a convex first surface 376 and a second surface 378. The second heat transfer insert 374 includes first conformal fluid conduits 380 and 388, second conformal fluid conduits 382 and 386, and third conformal fluid conduit 384.

As shown in FIG. 3B, first conformal fluid conduits 364 and 372, which have the largest cross-sectional area and therefore are capable of providing a greater degree of heat transfer, are positioned adjacent the thickest portion of the lens cavity 352; second conformal fluid conduits 366 and 370, which have an intermediate cross-sectional area are positioned adjacent an intermediate-thickness of the lens cavity 352; and third conformal fluid conduit 368, which has the smallest cross-sectional area, is positioned adjacent the thinnest portion of the lens cavity 352. As such, fluid flow across second conformal fluid conduits 366 and 382 is less relative to fluid flow across first conformal fluid conduits 372 and 388 to compensate for cooling a thinner cavity portion.

Figure 4A:
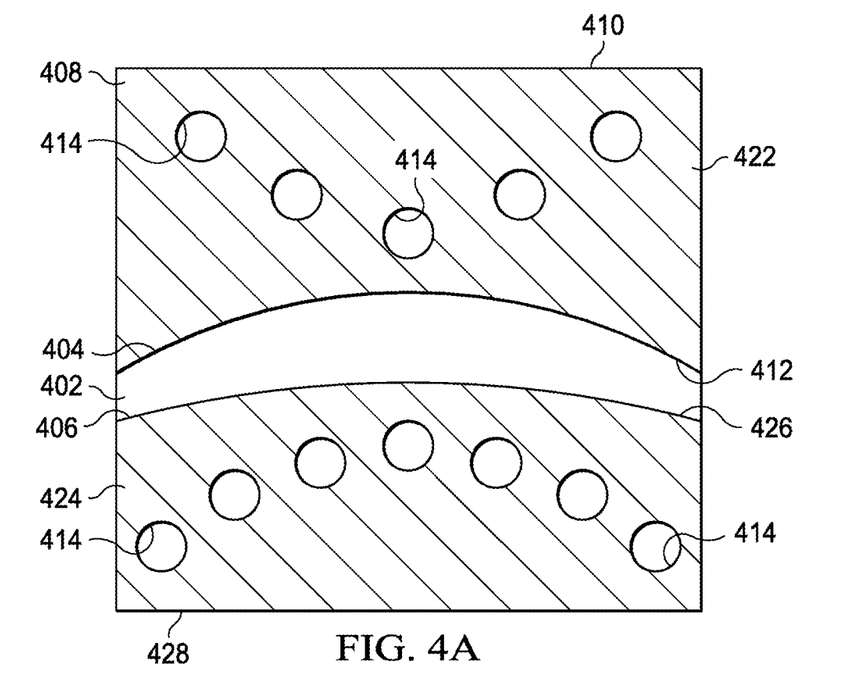

FIG. 4A illustrates an alternative embodiment of a heat transfer insert 410 having conformal fluid conduits adjacent a lens cavity 402 having non-uniform thickness. The lens cavity 402 has a convex upper surface 404 and an opposing concave lower surface 406. The lens cavity 402 has an increased thickness at the center of the cavity 402 and a decreased thickness at the edges to form a lens of similar dimensions. A first heat transfer insert 408 is disposed proximate to the upper surface 404 and a second heat transfer insert 424 is disposed proximate to lower surface 406. The first heat transfer insert 408 has a first surface 410 and a second surface 412. The first heat transfer insert 408 includes a plurality of conformal fluid conduits 414 that are configured to transfer heat from the lens cavity 402 and any lens material disposed therein. In the embodiment of FIG. 4A, conformal fluid conduits 414 are arranged closer to the thicker portions of the lens cavity 402 and further away from the thinner portions of the lens cavity 402. This arrangement provides for a greater degree of heat transfer at the center of the lens cavity 402 than at the peripheral, thinner portions of the lens cavity 402 to provide an even rate of cooling across the cavity. The conformal fluid conduits 414 are arranged in heat transfer insert 408 in an inverse arched pattern compared to the contour of the upper surface 404 of the lens cavity 402.

Like the first heat transfer insert 408, the second heat transfer insert 424 also has a first surface 426 and a second surface 428. The second heat transfer insert 424 also includes similarly arranged conformal fluid conduits 414 that are arranged in an arched pattern that is similar to the contour of the lower surface 406 of the lens cavity 402.

Figure 4B:
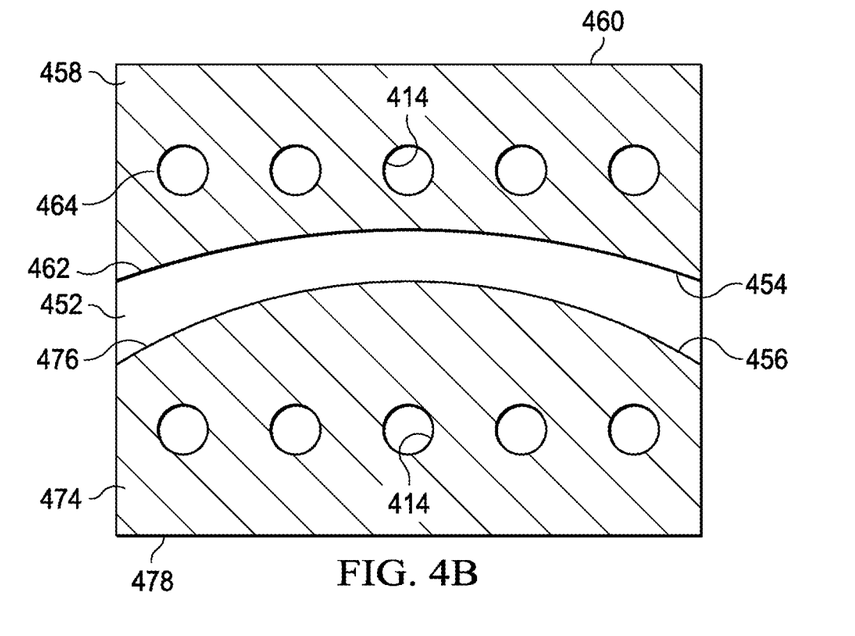

FIG. 4B illustrates placement of conformal fluid conduits 414 around a cavity 452 having non-uniform thickness. The cavity 452 has an upper surface 454 and an opposing lower surface 456. Similar to the arrangement of FIG. 4A, a first heat transfer insert 458 is disposed proximate to the first surface 454 and a second heat transfer insert 474 is disposed proximate to second surface 456. The first heat transfer insert 458 has a first surface 460 and a second surface 462. The first heat transfer insert 458 includes conformal fluid conduits 414 that are arranged in a substantially linear pattern. Second heat transfer insert 474 has a first surface 476 and a second surface 478. The second heat transfer insert 474 includes conformal fluid conduits 414 that are also arranged in a substantially linear pattern.

In the embodiment of FIG. 4B, to compensate for variations in thickness of the lens cavity 452, the flow rate of cooling fluid circulated through the conformal fluid conduits 414 may be varied such that fluid flow proximate the thicker portion of the lens cavity 452 is faster than through the conformal fluid conduits 414 at the thinner portion of the lens cavity 452 to provide a greater rate of heat transfer at the thicker portions. This arrangement also provides for a greater degree of heat transfer at thicker portions of the lens cavity 452 than at the thinner portions of the lens cavity 402 to provide an even rate of cooling across the cavity.

Figure 5:
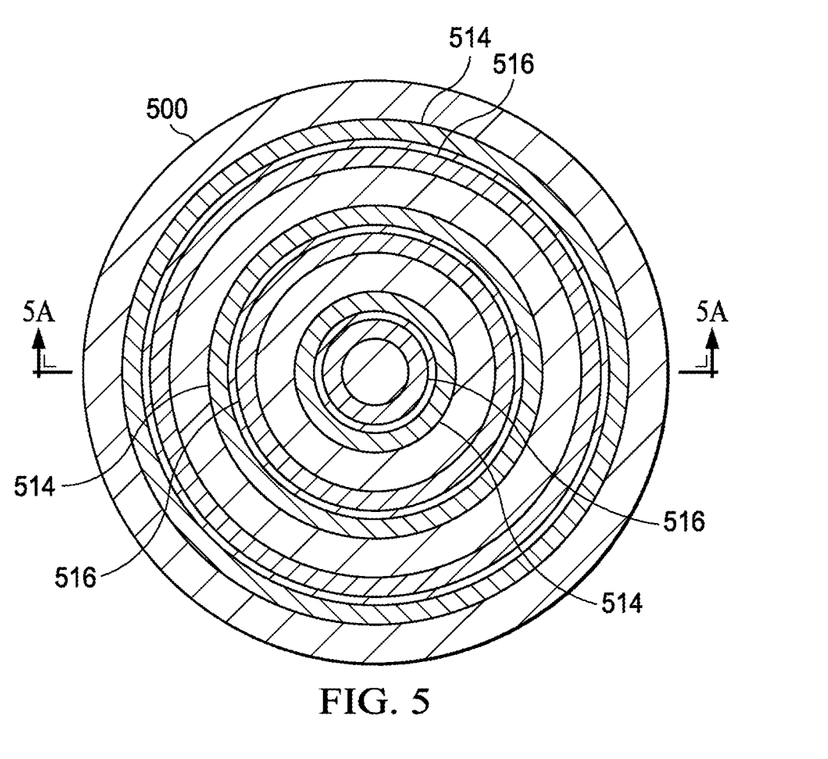
FIGS. 5 and 5A are top and side, section views, respectively, showing an alternative embodiment of a heat transfer insert having conformal fluid conduits and heating elements around a lens cavity having non-uniform thickness.
Figure 5A:
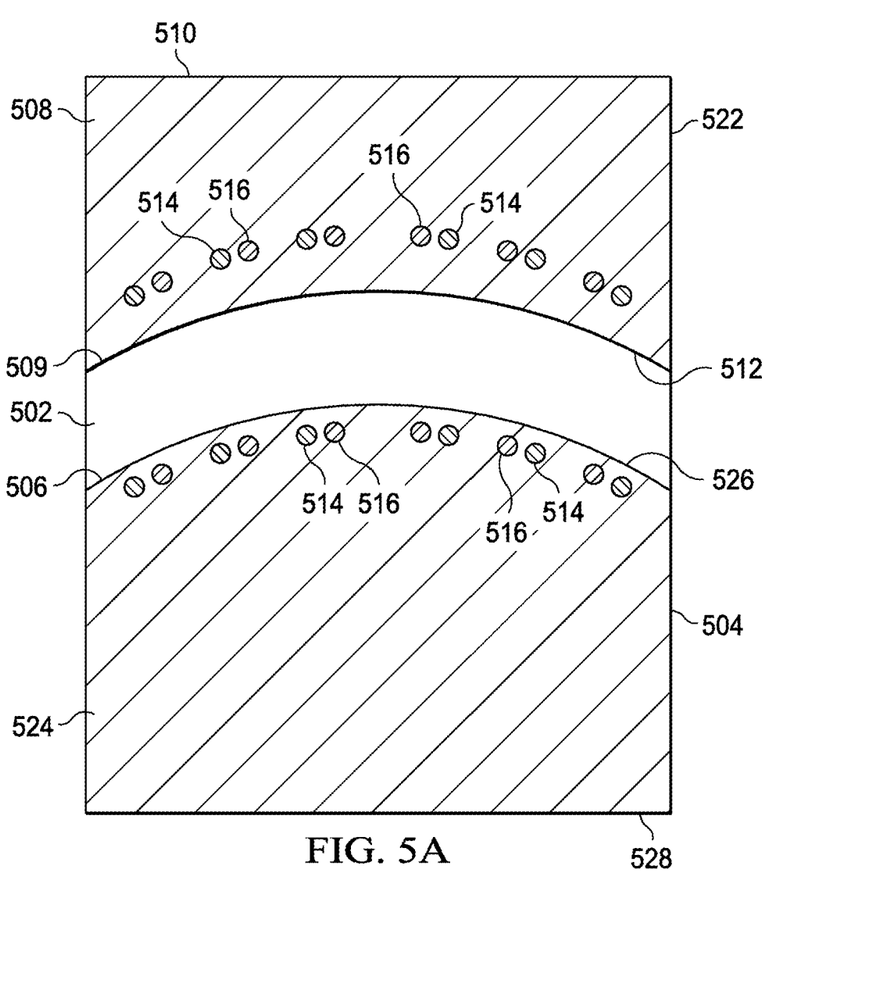

FIGS. 5 and 5A illustrate another embodiment of heat transfer inserts 510 having conformal fluid conduits 514 and heating elements positioned adjacent a lens cavity 502 having non-uniform thickness. It is noted that in the prior embodiments, the conformal fluid conduits may be used to circulate heating fluid when a mold operator desires to heat the lens cavity 502. In such examples, heating fluid may be circulated prior to or during molding until the operator desires to cool the lens material in the lens cavity 502. In the embodiment of FIG. 5, heating conduits 516 are positioned adjacent fluid conduits 514. The heating conduits 516 and fluid conduits 514 may be arranged in a manner similar to the conformal fluid conduits described above with regard to FIGS. 3A, 3B, 4A, and 4B. The heating conduits, however, may include heating mechanisms other than, or in addition to, heated fluid. For example, infrared or electrical (resistive) heating elements may be positioned within or proximate to the heating conduits to provide heat to the mold and associated lens cavity 502.

As previously noted, the heat transfer inserts described above may be formed using advanced manufacturing technologies, such as three-dimensional printing. In an embodiment, formation by additive manufacturing methods facilitates positioning of heat transfer inserts at desirable locations proximate to the cavities, and for the inclusion of conduits having varying flow characteristics, including flow restrictors or circuitous paths that may be difficult to form using conventional manufacturing methods. In one embodiment, for example, additive manufacturing methods are utilized to manufacture heat transfer inserts 210. In another embodiment, all of the components of the lens manufacturing system 200 are fabricated and positioned at their desired locations in the system using additive manufacturing methods.

It is noted that while the heat transfer inserts described previously are generally described as cooling the lens cavity, the inserts may also be used to heat a lens cavity by circulating a heated fluid through the referenced conduits. It follows that the inserts may be used to pre-heat the lens cavity and maintain the lens cavity at an increased temperature in addition to cooling the lens cavity and maintaining the lens cavity at a reduced temperature.

Figure 6:
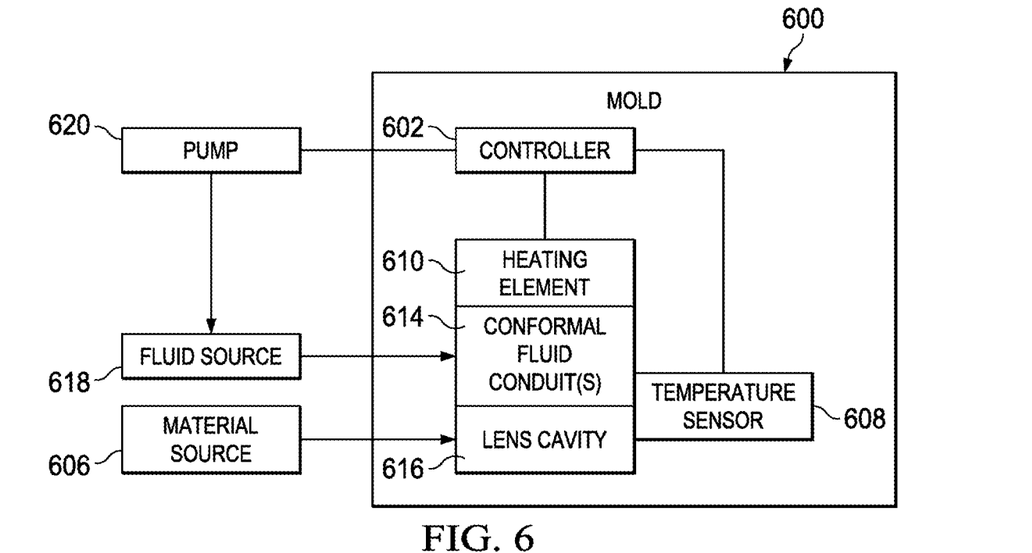
FIG. 6 is a block diagram showing an illustrative system for molding an optical lens.

To facilitate the heating and cooling of a mold using the conformal fluid conduits described above, a representative system is described in FIG. 6. The mold system 600 includes a controller 602 that is communicatively coupled to a material source 606, pump 620, (optional) heating element 610, and (optional) temperature sensor 608. The controller 602 is operable to actuate the material source 606 to provide material to a lens cavity 616 of the mold 604. The controller 602 may include a storage medium or memory, processor, and other necessary components to control the molding process. The process may be time or sequence-based and may operate partly in response to input received from one or more sensors. For example, a temperature sensor 608 may be coupled to conformal fluid conduits 614 and/or the lens cavity 616 to provide the controller 602 with one or more temperature measurements, as applicable. For example, the controller 602 may be operable to receive a temperature measurement corresponding to the lens cavity 616, and to actuate a heating element 610 to heat conformal fluid conduits 614 or heating elements that add heat to the lens cavity 616 if the measured temperature is lower than desired, or to maintain an elevated temperature relative to the ambient environment. Similarly, following the injection of material into the lens cavity 616, the controller 602 may be operable to actuate a pump 620 to cause the pump 620 to provide heating or cooling fluid from a fluid source 618 to conformal fluid conduits 614 adjacent the lens cavity 616. The controller may similarly be operable to monitor the rate of cooling at the lens cavity 616 and to accelerate or decelerate fluid flow to modify the rate of cooling to a selected rate.

Figure 7:
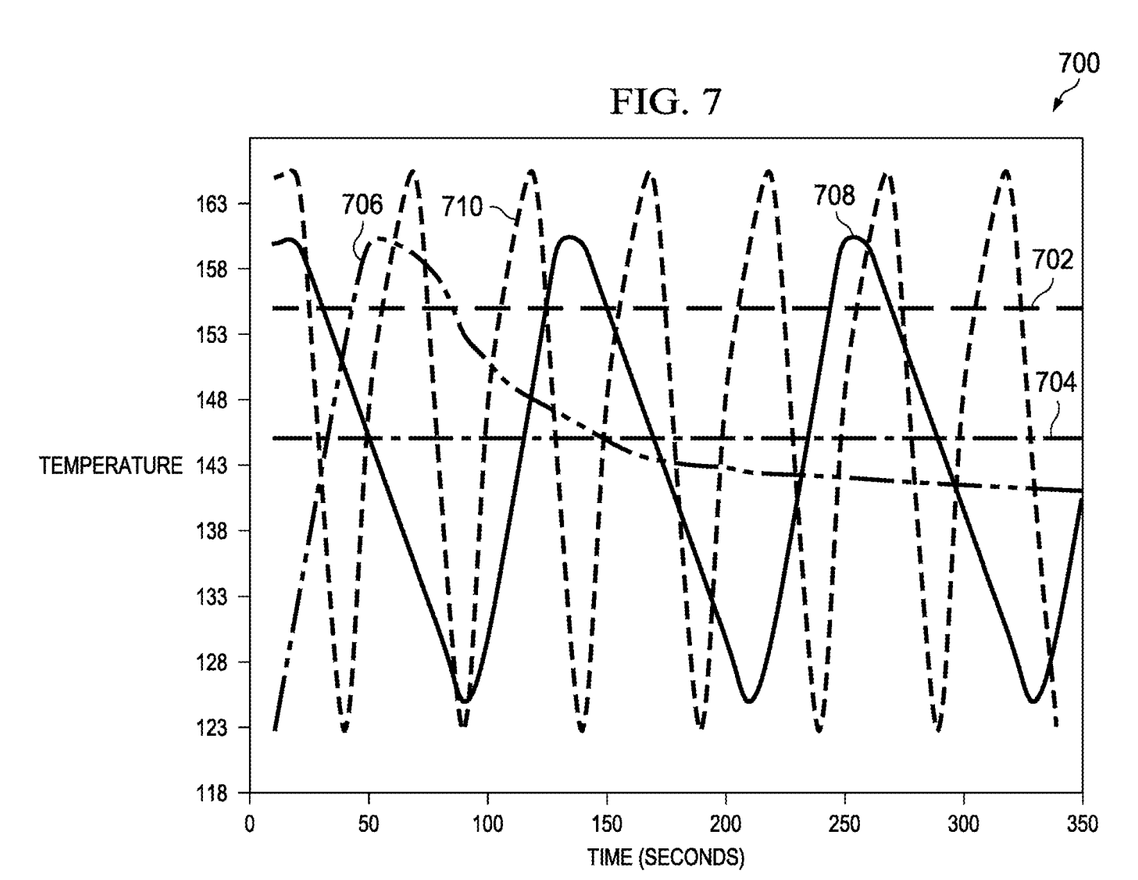
FIG. 7 is a line graph illustrating manufacturing cycle times of various lens manufacturing systems.

The ability to rapidly heat a mold and to cool a lens cavity evenly may result in improved mold performance, as illustrated in the graph illustrated in FIG. 7. FIG. 7 shows a line graph illustrating manufacturing cycle times of various lens manufacturing systems. Here, line 702 illustrates the melting temperature of the molded material and line 704 indicates the solidification temperature of the material. Line 706 illustrates the temperature of the mold material over time in a conventional molding process that does not actively cool the mold. Line 706 illustrates that in such a system, the mold may still be heated relatively quickly, but cooling is slow, resulting in a relatively slow cycle time before a molded part solidifies and can be removed from the mold. Similarly, line 708 shows how cycle times are relatively improved by basic heating and cooling, such as that described with regard to FIG. 1. The line 708 illustrates a faster cooling time and a correspondingly shortened cycle time resulting from such active cooling. Line 710 illustrates the effect of using conformal fluid conduits to heat and cool the mold cavity. The illustrated effect includes accelerated heating and accelerated cooling, resulting in drastically reduced cycle times even as compared to a mold having active cooling, thereby improving the economic and temporal efficiency of the molding process.

Figure 8:
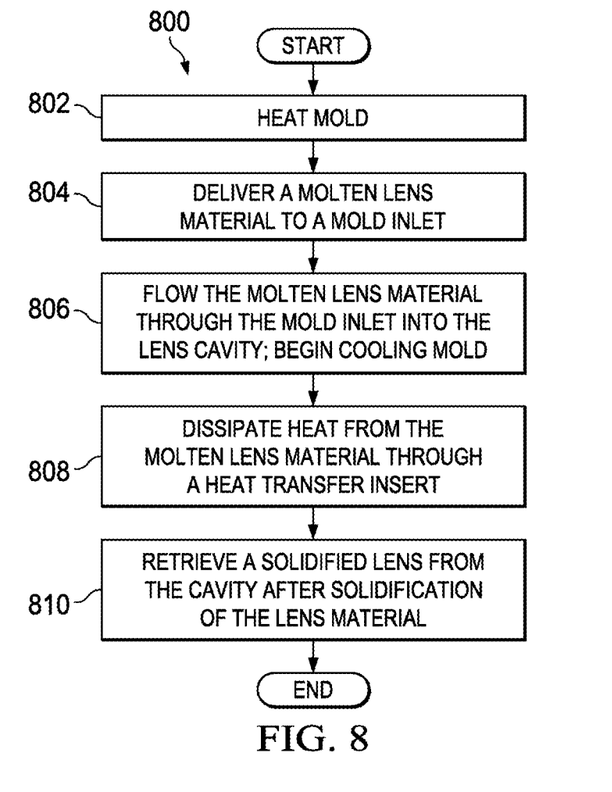
FIG. 8 is a flowchart illustrating an embodiment of a process for manufacturing lenses.

FIG. 8 is a flowchart illustrating an exemplary process for manufacturing lenses. The paragraphs below describe the operations of process 800 being performed on the lens manufacturing system 200 illustrated in FIG. 2 and utilizing heat transfer inserts such as those illustrated in FIGS. 3A, 3B, 4A, 4B. The process 800 may be performed on similar lens manufacturing systems or on any other embodiment of lens manufacturing systems described herein. Although operations in process 800 are shown in a particular order, certain operations may be performed in different orders or at the same time where feasible.

The mold is heated at step 802. At step 804, a molten lens material is delivered to a material flow path of a mold through a mold inlet. The material flow path includes a lens material inlet and a lens material outlet that is fluidly coupled to a cavity of a mold, the cavity has a structure that defines a lens. In the embodiment illustrated in FIG. 2, material flow path includes a lens material inlet coupled to a lens material source (not shown) and lens material outlets fluidly coupled to first cavity 202a and second cavity 202b. Molten lens material is delivered from the lens material source to the material flow path. At step 806, molten lens material is flowed through the material flow path into the lens cavity. Once the molten lens material has flowed into the lens cavity, the molten lens material is cooled to form a lens. Preferably, the molten lens material is cooled at a uniform rate across each cavity and throughout the mold.

At step 808, heat from the molten lens material is dissipated through a heat transfer insert. In the embodiment illustrated in FIG. 2, heat transfer inserts 210 have surfaces that are positioned very near the cavity surface of the first cavity 202a. Cooling fluid flows from sealed fluid inlets 212 through the heat transfer inserts 210 to sealed fluid outlets 214 to facilitate transfer of heat from the molten lens material in the first cavity 202a. Similarly, additional heat transfer inserts 210 may have surfaces that form portions of the cavity surface along opposite surfaces of second cavity 202b. The heat transfer inserts 210 are disposed at a plurality of positions to facilitate uniform transfer of heat from the molten lens material within the first and second cavities 202a and 202b.

Cooling fluid flow paths may include a single conformal fluid conduit or multiple conformal fluid conduits positioned across the cavity to facilitate uniform heat transfer across the cavity. In the embodiment illustrated in FIG. 3A, ten conformal fluid conduits 314, 316, 318, 320, 322, 330, 332, 334, 336, and 338 are disposed at different locations with respect to the cavity 302. Once the molten lens material has been cooled across the cavity the mold and the molten lens material has solidified into a desired shape, the solidified lens may be retrieved from the lens mold. Similarly, in molds with multiple cavities, once the molten lens material in all of the cavities has solidified into a desired shape, lenses may be retrieved from the mold cavities.

At step 810, a solidified lens is retrieved from the cavity after solidification of the molten lens material. The lens mold may include a lid, a hatch, or another mechanism that facilitates retrieval of the solidified lens. Once the solidified lens is retrieved from the lens mold, one cycle is complete and a new cycle illustrated by process 800 can be initiated.

While not shown in the illustrative process of FIG. 8, it is noted that the process may also include heating the mold and associated lens cavities by circulating a heated fluid through the heat transfer inserts. In such an embodiment, the methodology of heating the lens cavities is analogous to the process for cooling the lens cavities described previously.

In accordance with the foregoing disclosure, the process of FIG. 8 may be utilized to operate a lens manufacturing system having a mold having a part cavity (e.g., a lens cavity) and a material flow path, wherein the material flow path is fluidly coupled to the part cavity and a lens material inlet. The system further includes a heat transfer insert having an insert surface positioned adjacent to a part surface of the cavity. The heat transfer insert has a sealed fluid inlet, a sealed fluid outlet, and a conformal fluid conduit extending from the sealed fluid inlet to the sealed fluid outlet.

In some embodiments, the part cavity includes an arched upper surface and an arched lower surface, and the heat transfer insert includes an arched lower surface that forms the arched upper surface of the part cavity. A second heat transfer insert may also be included that has an upper arched insert surface that forms the arched lower surface of the part cavity. The part cavity may have a first portion having a first thickness and a second portion having a second thickness, the first thickness being greater than the second thickness. In addition, the conformal fluid conduit may include a first conformal fluid conduit overlying the first portion and a second conformal fluid conduit overlying the second portion. In such an embodiment, the first conformal fluid conduit may have an increased cross-sectional area relative to the second conformal fluid conduit. Moreover, the increased cross-sectional area may be in direct proportion to the variance between the first thickness and second thickness.

In some embodiments, the first conformal fluid conduit is positioned closer to the insert surface than the second conformal fluid conduit. In addition, the second conformal fluid conduit may include a flow restrictor (not shown) and may therefore be operable to circulate fluid at a reduced flow rate relative to the first conformal fluid conduit. In some embodiments, the heat transfer insert further includes a first heating element proximate the first conformal fluid conduit and a second heating element proximate the second conformal fluid conduit.

The heat transfer insert may be formed from a metal selected from a group consisting of steel, stainless steel, aluminum, copper, beryllium-copper alloy, a combination thereof, or any other suitable material. The heat transfer insert may be a distinct component that is insertable into and removable from the part cavity, and may alternatively be formed integrally to the part cavity using an additive manufacturing process (i.e., three-dimensional printing).

In the illustrative lens manufacturing system, the mold may include a cooling fluid inlet conduit coupled to the above-mentioned sealed fluid inlet and a cooling fluid outlet conduit coupled to the above-mentioned sealed fluid outlet. The mold may further include a plurality of part cavities and a plurality of heat transfer inserts, each having an insert surface that forms a part surface of a part cavity, a sealed fluid inlet, a sealed fluid outlet, and a conformal fluid conduit extending from the sealed fluid inlet to the sealed fluid outlet. As such, the mold may include a cooling fluid inlet conduit coupled to the sealed fluid inlets of the plurality of heat transfer inserts. In such an embodiment, the plurality of heat transfer inserts is positioned within or proximate to the plurality of part cavities. Thus, the heat transfer insert includes a boundary surface that is selected to form the boundary of an optical surface of the molded part. The boundary surface may be formed from a metal, glass, or a combination thereof.

An illustrative method for manufacturing a lens is also disclosed. The method includes heating a lens material to a temperature above its glass transition temperature ($T_g$) and delivering the heated lens material to a material flow path having a lens material inlet and a lens material outlet fluidly coupled to a cavity of a mold that defines a lens. The method further includes flowing the lens material through the material flow path into the cavity and dissipating heat from the lens material through a heat transfer insert that forms a part surface of the cavity. The heat transfer insert includes a conformal fluid conduit, and the method also includes retrieving a solidified lens from the cavity after solidification of the lens material.

In some embodiments, the method also includes raising the temperature of the surface of the cavity to a temperature that is above the glass transition temperature ($T_g$) of the lens material. The step of raising the temperature of the surface of the cavity may be accomplished by circulating a heated fluid through a plurality of conformal fluid conduits.

In some embodiments, the method also includes flowing the lens material through the material flow path into the cavity comprises substantially filling the cavity with the material and pressurizing the cavity.

In some embodiments, the method also includes lowering the temperature of lens material disposed within the cavity to a preselected temperature that is below the glass transition temperature ($T_g$) of the lens material, wherein the step of lowering the temperature of lens material disposed within the cavity comprises circulating a cooled fluid through a plurality of conformal fluid conduits.

In accordance with another illustrative embodiment, a heat transfer insert includes an insert surface that forms a part surface of a part cavity. The heat transfer insert includes a sealed fluid inlet, a sealed fluid outlet, and a conformal fluid conduit extending from the sealed fluid inlet to the sealed fluid outlet. In addition, the heat transfer insert may include any of the features described in connection with the above-described exemplary system.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification.

As used herein, a heat transfer insert being "adjacent" or "adjacent to" a cavity and vice versa are defined to mean that that the surface of the heat transfer insert defines a portion of a surface of the cavity that is adjacent to the respective heat transfer insert.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A method for manufacturing a lens, the method comprising:

heating a lens material to a temperature above its glass transition temperature;

delivering the heated lens material to a material flow path having a lens material inlet and a lens material outlet fluidly coupled to a cavity of a mold, the cavity defining a lens, the cavity including a first portion having a first thickness and a second portion having a second thickness, the first thickness being greater than the second thickness;

flowing the lens material through the material flow path into the cavity;

dissipating heat from the lens material through a heat transfer insert that forms a part surface of the cavity, the heat transfer insert comprising at least one conformal fluid conduit comprising a first conformal fluid conduit overlying the first portion, and a second conformal fluid conduit overlying the second portion, a first heating element proximate to the first conformal fluid conduit, and a second heating element proximate to the second conformal fluid conduit; and retrieving a solidified lens from the cavity after solidification of the lens material.

2. The method of claim 1, wherein the at least one conformal fluid conduit comprises a plurality of conformal fluid conduits, the method further comprising raising the temperature of the surface of the cavity to a temperature that is above the glass transition temperature of the lens material, the raising the temperature of the surface of the cavity comprising circulating a heated fluid through the plurality of conformal fluid conduits.

3. The method of claim 1, further comprising lowering the temperature of the lens material disposed within the cavity to a preselected temperature that is below the glass transition temperature of the lens material, the lowering the temperature of the lens material disposed within the cavity comprising circulating a cooled fluid through a plurality of conformal fluid conduits.

4. A lens manufacturing system comprising:

a mold having at least one part cavity and a material flow path, the material flow path being fluidly coupled to the at least one part cavity and a lens material inlet, the at least one part cavity comprising a first portion having a first thickness and a second portion having a second thickness, the first thickness being greater than the second thickness; and at least one heat transfer insert having an insert surface that forms a part surface of the at least one part cavity, the at least one heat transfer insert comprising a sealed fluid inlet, a sealed fluid outlet, at least one conformal fluid conduit extending from the sealed fluid inlet to the sealed fluid outlet, the at least one conformal fluid conduit comprising a first conformal fluid conduit overlying the first portion, and a second conformal fluid conduit overlying the second portion, a first heating element proximate to the first conformal fluid conduit, and a second heating element proximate to the second conformal fluid conduit.

5. The lens manufacturing system of claim 4, wherein the at least one part cavity comprises an arched upper surface and an arched lower surface, and wherein the at least one heat transfer insert includes a first heat transfer insert comprising an arched lower surface that forms the arched upper surface of the part cavity.

6. The lens manufacturing system of claim 5, wherein the at least one heat transfer insert includes a second heat transfer insert having an upper arched insert surface that forms the arched lower surface of the part cavity.

7. The lens manufacturing system of claim 4, wherein the first conformal fluid conduit has an increased cross-sectional area relative to the second conformal fluid conduit.

8. The lens manufacturing system of claim 7, wherein the first conformal fluid conduit has a cross-sectional area that is related to the first thickness and the second conformal fluid conduit has a cross-sectional area that is related to the second thickness.

9. The lens manufacturing system of claim 4, wherein the first conformal fluid conduit is positioned closer to the insert surface than the second conformal fluid conduit.

10. The lens manufacturing system of claim 4, wherein the second conformal fluid conduit comprises a flow restrictor and is operable to circulate fluid at a reduced flow rate relative to the first conformal fluid conduit.

11. The lens manufacturing system of claim 4, wherein the at least one heat transfer insert comprises a metal selected from a group consisting of steel, stainless steel, ceramic, aluminum, copper, beryllium-copper alloy, and a combination thereof.

12. The lens manufacturing system of claim 4, wherein the at least one heat transfer insert is insertable into and removable from the part cavity.

13. The lens manufacturing system of claim 4, wherein the at least one heat transfer insert is formed using a manufacturing process that comprises an additive manufacturing process.

14. The lens manufacturing system of claim 4, wherein the mold comprises a cooling fluid inlet conduit coupled to the sealed fluid inlet and a cooling fluid outlet conduit coupled to the sealed fluid outlet.

15. The lens manufacturing system of claim 4, wherein the mold comprises a plurality of the at least one part cavity and a plurality of the at least one heat transfer insert that each has the insert surface that forms the part surface of one of the part cavities, the sealed fluid inlet, the sealed fluid outlet, and the conformal fluid conduit extending from the sealed fluid inlet to the sealed fluid outlet, and wherein the mold further comprises a cooling fluid inlet conduit coupled to the sealed fluid inlets of the plurality of heat transfer inserts.

16. The lens manufacturing system of claim 15, wherein the plurality of heat transfer inserts are positioned within the plurality of part cavities.

17. The lens manufacturing system of claim 4, wherein the at least one heat transfer insert comprises a boundary surface that is selected to form the boundary of an optical surface.

18. The method of claim 1, further comprising:

sensing, by a temperature sensor, a temperature measurement corresponding to the lens cavity; and heating one or more of the first and second heating elements to add heat to the lens cavity based on the sensed temperature measurement.

* * * * *